ROBERT MARSHALL.
Improvement in Sap-Bucket Covers.

No. 119,779. Patented Oct. 10, 1871.

Witnesses:
E. Wolff
Francis McArdle

Inventor:
R. Marshall
Per ———
Attorneys.

UNITED STATES PATENT OFFICE.

ROBERT MARSHALL, OF HOBART, NEW YORK.

IMPROVEMENT IN SAP-BUCKET COVERS.

Specification forming part of Letters Patent No. 119,779, dated October 10, 1871.

*To all whom it may concern:*

Be it known that I, ROBERT MARSHALL, of Hobart, in the county of Delaware and State of New York, have invented a new and useful Improvement in Cover for Sap-Buckets; and I do hereby declare that the following is a full, clear, and exact description thereof, which will enable others skilled in the art to make and use the same, reference being had to the accompanying drawing forming a part of this specification.

The object of this invention is to prevent snow, rain, leaves, and other foreign matter from getting into buckets which are placed to catch the sap from maple trees in the process of making maple-sugar; and it consists of a flanged cover, supported over the bucket by the tree, in the manner hereinafter described.

Figure 1:
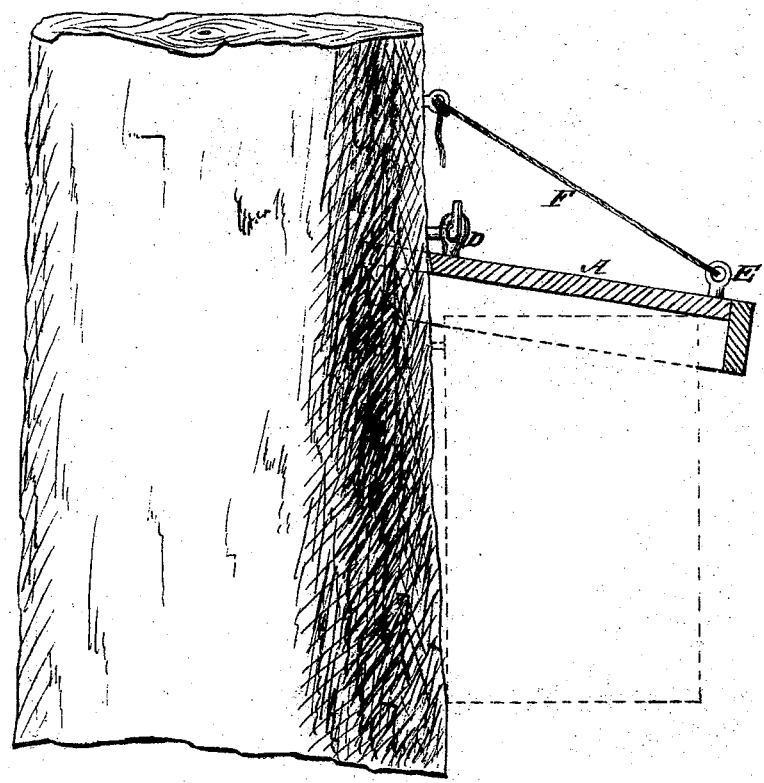
Figure 2:
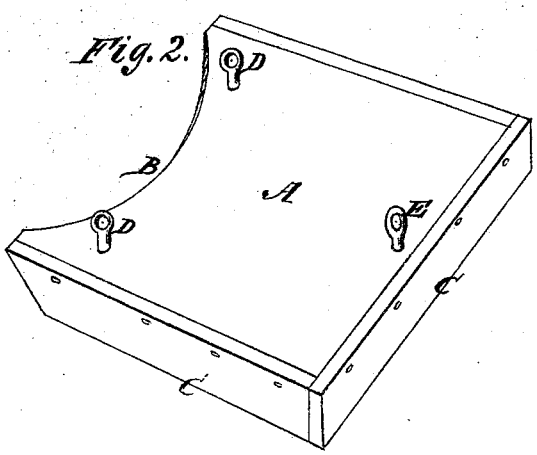

In the accompanying drawing, Figure 1 represents a vertical section of the cover attached to the tree as when in use, the bucket being seen in dotted lines. Fig. 2 is a top view of the cover in perspective.

Similar letters of reference indicate corresponding parts.

A is the cover, which is formed of a square piece of board or metal, with one edge, B, rounded out, forming the arc of a circle to nearly correspond with the diameter of the tree. On the other three edges of the cover there is a flange, C, projecting down three inches, (more or less,) so as to completely cover the top of the bucket and exclude leaves, snow, rain, and all foreign substances. On top of the cover, near the circle C, are two screw-eyes, D D, which engage with the hooks driven into the tree for supporting that edge of the cover. On the opposite edge is another screw-eye, E, to which a cord, F, is attached, which is tied with a hook in the tree, as seen in Fig. 1, to support the cover in an inclined position, as seen.

Without some kind of protection sap-buckets are liable to receive whatever may be flying in the atmosphere or drops from the trees, and the sap is thereby frequently rendered nearly useless. With my improved cover the bucket is perfectly protected, and the sap caught therein is preserved pure and fit for use without reference to the state of the weather or what may be falling or flying in the air.

Having thus described my invention, what I claim as new, and desire to secure by Letters Patent, is—

The cover A, concaved at B, flanged at C, and having eyes D E, combined with cord F and a staple driven into the tree, to embody a new mode of protecting the bucket from snow, rain, leaves, and other foreign matter descending through the air.

ROBERT MARSHALL.

Witnesses:
   A. G. PARSHALL,
   H. MARSHALL. (155)